(12) United States Patent
Chung et al.

(10) Patent No.: US 7,554,344 B2
(45) Date of Patent: Jun. 30, 2009

(54) APPARATUS AND METHOD OF ADJUSTING SYSTEM EFFICIENCY

(75) Inventors: Chien-Ping Chung, Taipei (TW); Chung-Ching Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 176 days.

(21) Appl. No.: 11/622,027

(22) Filed: Jan. 11, 2007

(65) Prior Publication Data

US 2008/0012585 A1 Jan. 17, 2008

(30) Foreign Application Priority Data

Jun. 20, 2006 (TW) ................................ 95122104 A

(51) Int. Cl.
*G01R 27/08* (2006.01)
*G01R 31/08* (2006.01)

(52) U.S. Cl. ....................... 324/713; 324/522

(58) Field of Classification Search ................. 324/522, 324/512, 500, 713, 691, 649, 600
See application file for complete search history.

(56) References Cited

U.S. PATENT DOCUMENTS

| 4,715,353 | A | * | 12/1987 | Koike et al. ................. | 123/590 |
| 5,574,352 | A | * | 11/1996 | Endo et al. .................. | 318/802 |
| 6,084,418 | A | * | 7/2000 | Takami et al. ................ | 327/717 |
| 6,118,798 | A | * | 9/2000 | Ema et al. ............... | 372/29.011 |
| 6,388,416 | B1 | * | 5/2002 | Nakatani et al. ............. | 318/700 |
| 6,960,893 | B2 | * | 11/2005 | Yoshida et al. .............. | 318/127 |
| 7,025,571 | B2 | * | 4/2006 | Jeun ....................... | 318/400.08 |
| 2006/0228224 | A1 | * | 10/2006 | Hong et al. ................. | 417/44.1 |

FOREIGN PATENT DOCUMENTS

| CN | 1797008 | | 7/2006 |
| CN | 1908844 A | * | 2/2007 |
| JP | 11206199 | | 7/1999 |

OTHER PUBLICATIONS

English Abstract of JP11206199.
TW Office Action mailed Apr. 23, 2009.

* cited by examiner

*Primary Examiner*—Vincent Q Nguyen
*Assistant Examiner*—Hoai-An D Nguyen
(74) *Attorney, Agent, or Firm*—Thomas, Kayden, Horstemeyer & Risley

(57) ABSTRACT

Apparatus and methods of adjusting system efficiency for a current-consuming system are disclosed. In the disclosed apparatus, a system current detector receives a system current from the current-consuming system and calculates a system current variation accordingly. A system efficiency adjustment module is coupled to the system current detector to receive the system current variation and output a frequency control signal and a voltage control signal accordingly.

20 Claims, 4 Drawing Sheets

APPARATUS AND METHOD OF ADJUSTING SYSTEM EFFICIENCY

BACKGROUND OF THE INVENTION

1. Field of the Invention

The invention relates to a dynamic system efficiency adjustment method, and in particular to apparatus and method of adjusting system efficiency dynamically according to variations in current consumed by an electronics system.

2. Description of the Related Art

Currently, environmental impact has been an important consideration for electronic design. Reduction of system power consumption of electronic products is one example, wherein, as system power utilization improves, power consumption is reduced and system efficiency increased accordingly.

Conventional power conservation in electronics devices and systems is generally managed by software according to standards defined by Advanced Configuration and Power Interface (ACPI). Power management applications estimate possible power utilization by the electronic system according to CPU utilization, entering different power conservation modes accordingly. However, because the various power conservation modes are limited when controlled by software, actual operating states of the electronic system cannot response to system power management in a timely manner. Moreover, because system power utilization must be estimated, errors easily occur.

Thus, an important consideration is efficient control of system power consumption such that efficiency is improved.

BRIEF SUMMARY OF THE INVENTION

A detailed description is given in the following embodiments with reference to the accompanying drawings.

Apparatuses for adjusting system efficiency, suitable for a current-consuming system, are provided, comprising a system current detector and a system efficiency adjustment module, in which the current-consuming system can be an electronic element (such as a chipset), an electronic device (such as a power source), a computer system, or the like.

Further, the invention provides methods of adjusting system efficiency suitable for a current-consuming system, in which a system current from the current-consuming system is received, and a system current variation is calculated according to the system current. For example, the system current can originate with a power supply of a system, the current-consuming system can be an electronic element (such as a chipset), an electronic device (such as a power source), a computer system, or the like.

A frequency control signal and a voltage control signal are output according to the system current variation and a variation code table. The frequency control signal is output to a clock generator, and a frequency signal is generated according to the frequency control signal and a frequency control parameter table. The voltage control signal is output to a voltage controller, and a voltage signal is generated according to the voltage control signal and a voltage control parameter table.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
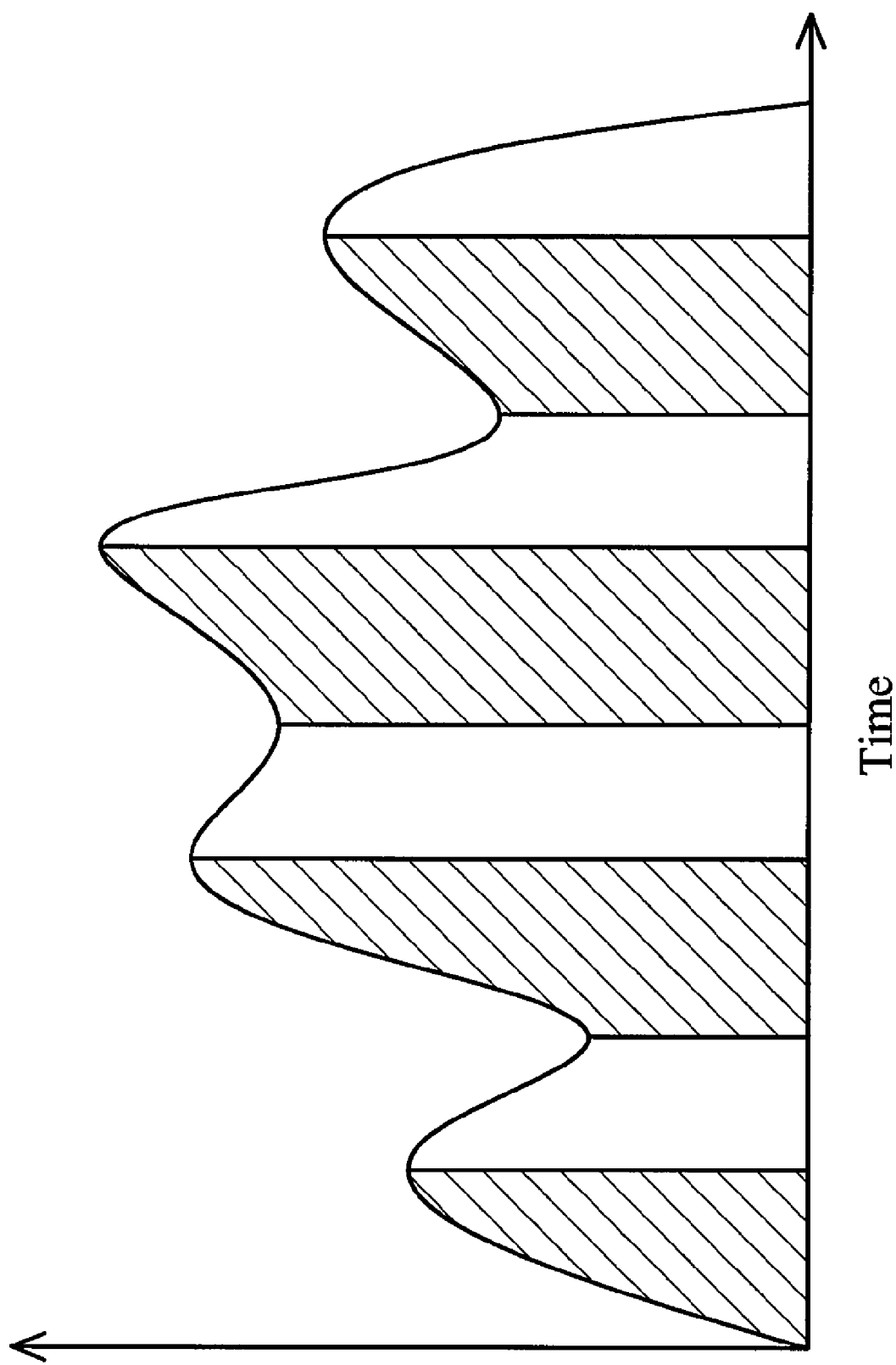
FIG. 1 shows a power consumption curve.

FIG. 1 shows a power consumption curve, in which the vertical axis represents power consumption, the horizontal axis represents time, and the power consumption curve is divided two parts, a slash part and a space part. With regard to the slash part, the output power is increased as requirement for system power is increased, and thus, the power consumption curve varies with a positive slope. Conversely, the output power in the space part is decreased as requirement for system power is decreased, and thus, the power consumption curve varies with a negative slope. In view of this, system power consumption dynamically varies during system operation and as the system adjusts output power dynamically according to the power requirement thereof, efficiency is enhanced. Specifically in electronic systems relying heavily on power conservation, such as notebook computers, if output power is adjusted dynamically, battery life can be extended and system efficiency improved.

Power consumption of the electronic system can be represented as:

$P = V \times I$, wherein P, V and I represent the system power, the operating voltage and the consumption current of the electronic system respectively.

Generally, the operating voltage of electronic components, electronic devices or computer systems is tied to a constant during power up, and thus, system power varies with consumption current. Namely, the variation in system power can be obtained by detecting the current curve of the system.

System management efficiency can be actualized by controlling system frequency and system voltage. In view of this, if frequency and voltage signals controlling the system can be generated automatically and timely according to the variation in system current, system efficiency can be effectively adjusted.

Figure 2:
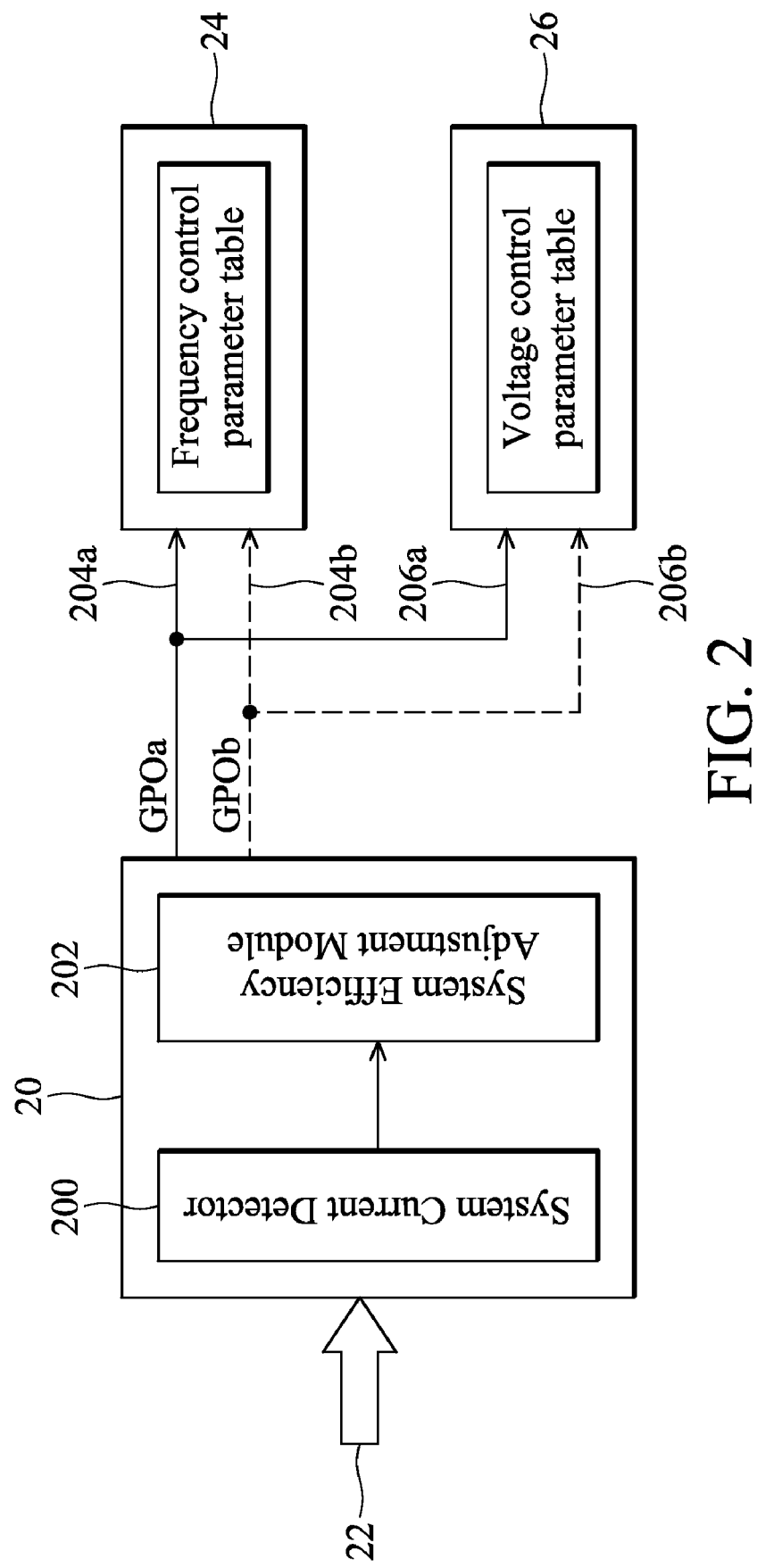
FIG. 2 shows an embodiment of an apparatus of adjusting system efficiency.

FIG. 2 shows an embodiment of an apparatus for adjusting system efficiency. As shown, the apparatus 20 is suitable for a current-consuming system and comprises a system current detector 200 and a system efficiency adjustment module 202. For example, the current-consuming system can be an electronic element (such as a chipset), an electronic device (such as a power source), a computer system, or the like.

The system current detector 200 receives a system current from the current-consuming system and calculates a system current variation accordingly. For example, the system current can be obtained from a power supply (power source) of the system. When the system current is represented by a current curve, the calculated current variation can be the slope of the current slope, i.e. the variation in the system current during a specific time interval.

The system efficiency adjustment module 202 receives the system current variation and outputs a frequency control signal 204 and a voltage control signal 206 accordingly. For example, the system efficiency adjustment module 202 can output the frequency control signal 204 and the voltage control signal 206 according to a variation code table and the system current variation.

The frequency control signal 204 is output to a clock generator 24, which in turn generates frequency signals according to the frequency control signal 204 and a frequency control parameter table. Similarly, the voltage control signal is output to a voltage controller 26, such that the voltage controller 26 generates voltage signals according to the voltage control signal 206 and a voltage control parameter table. Resultingly generated frequency signals and the generated voltage signals can be used to adjust system efficiency accordingly.

For example, when the system current decreases, the system consumption is lowered, and when the system frequency is decreased, system power consumption is lowered accordingly. Thus, system power is adjusted dynamically and in a timely manner according to variations in system current and a frequency control signal 204 and a voltage control signal 206 are further output according to a variation code table, thereby improving system efficiency.

The system current detector 200 receives a system current 22 from the current-consuming system and calculates a system current variation accordingly. For example, the system current 22 can be obtained from a power supply (power source) of the system.

The system efficiency adjustment module 202 receives the system current variation and outputs a frequency control signal 204 and a voltage control signal 206 accordingly. For example, the system efficiency adjustment module 202 can output the frequency control signal 204 and the voltage control signal 206 according to the system current variation and the variation code table. Table 1 shows an example of the variation code table for the system current variation.

TABLE 1

| Variation in system current | Control signal GPOa | Control signal GPOb |
| --- | --- | --- |
| Variation > 50 | High | High |
| 50 > Variation > 25 | Low | High |
| 25 > Variation > 10 | High | Low |
| Variation < 10 | Low | Low |

It should be noted that the Table 1 shows only one example, and the disclosure is not limited thereto. If classification of the variations in system current increase, classifications as shown in the first column of Table 1 also increase, and thus, more control signals are generated. For example, if variation in system current is classified by 8 sets, three control signals, GPOa, GPOb and GPOc can be used to adjust system efficiency.

The frequency control signal 204 is output to the clock generator 24, such that the clock generator 24 generates frequency signals according to the frequency control signal 204 and the frequency control parameter table. Table 2 shows an exemplary frequency control parameter table.

TABLE 2

| Frequency control signal 204a | Frequency control signal 204b | Frequency control parameter (normal mode) | Frequency control parameter (power conservation mode) |
| --- | --- | --- | --- |
| High | High | ↑ 10% | +/−0% |
| Low | High | ↑ 7% | ↓ 5% |
| High | Low | ↑ 4% | ↓ 10% |
| Low | Low | +/−0% | ↓ 20% |

The voltage control signal 206 is output to a voltage controller 26, such that the voltage controller 26 generates voltage signals according to the voltage control signal 206 and the voltage control parameter table. Table 3 shows an example of the voltage control parameter table.

TABLE 3

| Voltage control signal 206a | Voltage control signal 206b | Voltage control parameter (normal mode) | Voltage control parameter (power conservation mode) |
| --- | --- | --- | --- |
| High | High | ↑ 10% | +/−0% |
| Low | High | ↑ 7% | ↓ 5% |
| High | Low | ↑ 4% | ↓ 10% |
| Low | Low | +/−0% | ↓ 20% |

Similarly, it should be noted that Tables 2 and 3 are only examples, and the disclosure is not limited thereto. If classification of the variations in system current increase, classifications also increase, and thus, more frequency control signals and voltage control signals are generated. The more classification of the frequency control signals and voltage control signals, the more classification of Frequency control parameter and Voltage control parameter in normal mode or in power conservation mode.

Figure 3:
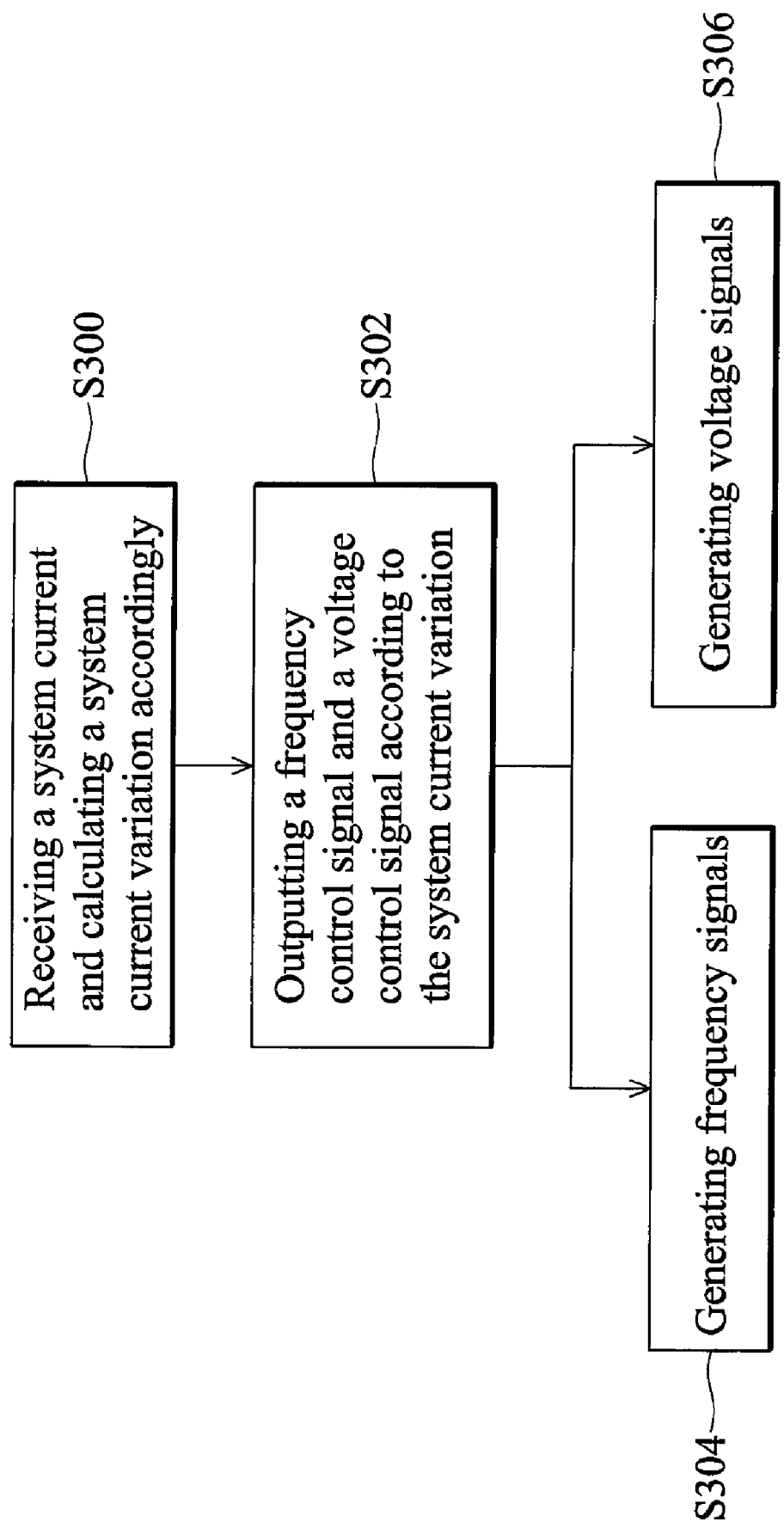
FIG. 3 is a flowchart of a method of adjusting system efficiency according to the invention.

FIG. 3 is a flowchart of a method of adjusting system efficiency according to the invention. The method of adjusting system efficient is suitable for a current-consuming system. In step S300, a system current from a current-consuming system is received and a system current variation is calculated accordingly. For example, the system current can be from a power supply (power source) of the current-consuming system. The current-consuming system can be an electronic element (such as a chipset), an electronic device (such as a power source), a computer system, or the like.

In step S302, a frequency control signal and a voltage control signal are generated according to the system current variation. For example, the frequency control signal and the voltage control signal can be generated according to the system current variation and a variation code table.

In step S304, the frequency control signal is output to a clock generator, such that the clock generator generates frequency signals according to the frequency control signal and a frequency control parameter table. In step S306, the voltage control signal is output to a voltage controller, such that the voltage controller generates voltage signals according to the voltage control signal and a voltage control parameter table.

Figure 4:
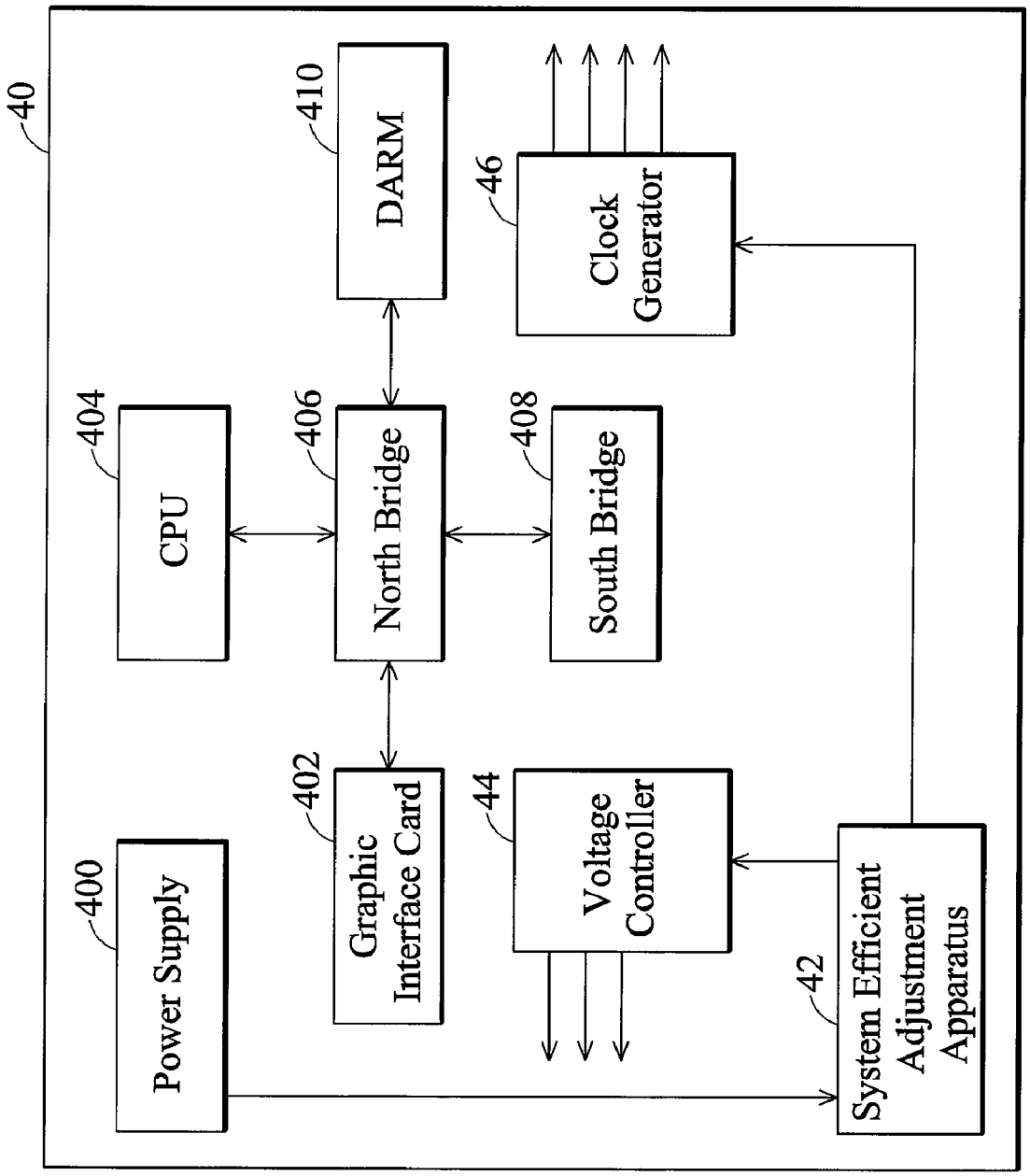
FIG. 4 shows an embodiment of an apparatus of adjusting system efficiency according to the invention.

FIG. 4 shows an embodiment of an apparatus of adjusting system efficiency according to the invention. As shown, the apparatus is applied to a computer system 40 comprising a power supply 400, a graphic interface card 402, a central processing unit (CPU) 404, a Northbridge 406, a Southbridge 408 and a dynamic random access memory (DARM) 410 and the like. The computer system 40 further comprises the apparatus 42 of adjusting system efficiency (called system efficiency adjustment apparatus hereinafter) and a voltage controller 44 and a clock generator 46.

First, after computer system 40 is powered on, the computer system 40 is booted with default values prior to initialization of variation code table in the system efficient adjustment apparatus 42, frequency control parameter table in the clock generator 46 and voltage control parameter table in the voltage controller.

Basic input/output system (BIOS) sets variation code table for system current to the system efficient adjustment apparatus 42 according to the characteristics of the computer system 40 and determines default values of the frequency control parameter table and the voltage control parameter table according to communication protocol, during power-on self test (POST).

The system efficient adjustment apparatus 42, the clock generator 46 and the voltage controller 44 are then activated to adjust system efficiency of the computer system 40 dynamically. Hence, the system current detector in the apparatus 42 receives the system current from the power supply 400 and calculates the system current variation accordingly.

Then, the system efficient adjustment module in the apparatus 42 outputs a frequency control signal and a voltage control signal according to the calculated system current variation and a variation code table.

The frequency control signal is output to the clock generator 46, such that the clock generator 46 generates frequency signals according to the frequency control signal and the frequency control parameter table. Similarly, the voltage control signal is output to the voltage controller 44, such that the voltage controller 44 generates voltage signals according to the voltage control signal and the voltage control parameter table. Hence, the generated frequency and voltage signals can adequately respond to power consumed by the computer system 40, improving system efficiency.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for adjusting system efficiency, suitable for a current-consuming system, comprising:
   a system current detector receiving a system current from the current-consuming system and calculating a system current variation accordingly; and
   a system efficiency adjustment module coupled to the system current detector, receiving the system current variation and outputting a plurality of frequency control signals and a plurality of voltage control signals accordingly,
   wherein logic states of the frequency control signals and logic states of the voltage control signals are determined by the system current variation and a variation code table.

2. The apparatus as claimed in claim 1, wherein the frequency control signals are output to a clock generator.

3. The apparatus as claimed in claim 2, wherein the clock generator generates at least one frequency signal according to the frequency control signals and a frequency control parameter table.

4. The apparatus as claimed in claim 1, wherein the voltage control signals are output to a voltage controller.

5. The apparatus as claimed in claim 4, wherein the voltage controller generates at least one voltage signal according to the voltage control signals and a voltage control parameter table.

6. The apparatus as claimed in claim 4, wherein the voltage controller generates at least one voltage signal according to the voltage control signals and a system operation mode.

7. The apparatus as claimed in claim 1, wherein the current-consuming system is an electronic element or an electronic device or a computer system.

8. The apparatus as claimed in claim 2, wherein the clock generator generates at least one frequency signal according to the frequency control signals and a system operation mode.

9. A method of adjusting system efficiency, suitable for a current-consuming system, comprising:
   receiving a system current from the current-consuming system;
   calculating a system current variation according to the system current;
   determining logic states of a plurality of frequency control signals and logic states of a plurality of voltage control signals according to the system current variation and a variation code table; and
   outputting the frequency control signals and the voltage control signals simultaneously.

10. The method as claimed in claim 9, further comprising generating at least one frequency signal according to the frequency control signals and a system operation mode.

11. The method as claimed in claim 9, further comprising generating at least one voltage signal according to the voltage control signals and a system operation mode.

12. The method as claimed in claim 9, wherein the frequency control signals are output to a clock generator.

13. The method as claimed in claim 12, further comprising generating at least one frequency signal according to the frequency control signals and a frequency control parameter table.

14. The method as claimed in claim 9, wherein the voltage control signals are output to a voltage controller.

15. The method as claimed in claim 14, wherein the voltage controller generates at least one voltage signal according to the voltage control signals and a voltage control parameter table.

16. The method as claimed in claim 9, wherein the current-consuming system is an electronic element or an electronic device or a computer system.

17. A current-consuming system, comprising:
   a system current detector receiving a system current from the current-consuming system and calculating a variation of the system current accordingly;
   a system efficiency adjustment module coupled to the system current detector, outputting a plurality of frequency control signals and a plurality of voltage control signals according to the variation of the system current;
   a voltage controller generating at least one voltage signal according to logic states of the voltage control signals; and
   a clock generator generating at least one frequency signal according to logic states of the frequency control signals.

18. The current-consuming system as claimed in claim 17, wherein the system efficiency adjustment module outputs the frequency control signals and the voltage control signals according to the variation of the system current and a variation code table.

19. The current-consuming system as claimed in claim 17, wherein the clock generator generates the frequency signal according to the logic states of the frequency control signals and a frequency control parameter table, and the voltage controller generates the voltage signal according to the logic states of the voltage control signals and a voltage control parameter table.

20. The current-consuming system as claimed in claim 17, wherein the clock generator generates the frequency signal according to a system operation mode, a frequency control parameter table and the logic states of the frequency control signals, and the voltage controller generates the voltage signal according to the system operation mode, a voltage control parameter table and the logic states of the voltage control signals.

* * * * *